United States Patent
Hacker et al.

(10) Patent No.: US 10,027,860 B2
(45) Date of Patent: Jul. 17, 2018

(54) ARRANGEMENT FOR AN IMAGE RECORDING DEVICE IN A VEHICLE

(71) Applicants: VOLKSWAGEN AG, Wolfsburg (DE); CALESCO FOIL, Kolbäck (SE)

(72) Inventors: Roland Hacker, Isenbüttel (DE); Kjell Jacobsen, Eskilstuna (SE); Pär Ohlsson, Kolbäck (SE)

(73) Assignees: VOLKSWAGEN AG (DE); CALESCO FOIL (SE)

( * ) Notice: Subject to any disclaimer, the term of this patent is extended or adjusted under 35 U.S.C. 154(b) by 0 days.

(21) Appl. No.: 15/355,211

(22) Filed: Nov. 18, 2016

(65) Prior Publication Data
US 2017/0070651 A1  Mar. 9, 2017

Related U.S. Application Data

(63) Continuation of application No. 13/989,542, filed as application No. PCT/EP2011/005354 on Oct. 24, 2011, now Pat. No. 9,503,619.

(30) Foreign Application Priority Data

Nov. 26, 2010 (DE) .................. 10 2010 052 472

(51) Int. Cl.
*H04N 5/225* (2006.01)
*B60J 1/00* (2006.01)
(Continued)

(52) U.S. Cl.
CPC ............ *H04N 5/2252* (2013.01); *B60J 1/002* (2013.01); *B60R 11/04* (2013.01); *B60R 2011/0026* (2013.01)

(58) Field of Classification Search
None
See application file for complete search history.

(56) References Cited

U.S. PATENT DOCUMENTS 5,787,228 A   7/1998 Fiely
5,824,993 A   10/1998 Chrysochoos
(Continued)

FOREIGN PATENT DOCUMENTS

DE   202004007360 U1   9/2004
DE   102004057322 A1   6/2006
(Continued)

OTHER PUBLICATIONS

Watlow; Radiant Heating with Infrared; A Technical Guide to Understanding and Applying Infrared Heaters; 1997.
(Continued)

*Primary Examiner* — Sathyanaraya V Perungavoor
*Assistant Examiner* — Clifford Hilaire
(74) *Attorney, Agent, or Firm* — Barnes & Thornburg LLP

(57) ABSTRACT

An arrangement for an image recording device in a vehicle having an image recording device for recording image data. The arrangement includes a carrier part which can be positioned on the vehicle with the front side of the carrier part on or in front of the inside of a vehicle window, retaining elements for retaining the image recording device, the retaining elements are coupled to the carrier part in such a way that the optical recording axis of the image recording device is directed into an area in front of the front side of the carrier part, and a heating device, the heating device designed in such a way that the thermal radiation produced by the heating device in the direction of the area in front of the front side of the carrier part is determined. Also disclosed is a method for controlling the heating device in such an arrangement.

8 Claims, 2 Drawing Sheets

(51) Int. Cl.
    *B60R 11/04*         (2006.01)
    *B60R 11/00*         (2006.01)

(56)           References Cited

U.S. PATENT DOCUMENTS

| | | |
|---|---|---|
| 7,211,771 B1 | 5/2007 | Smith |
| 2003/0174865 A1 | 9/2003 | Vernon |
| 2011/0233248 A1 | 9/2011 | Flemming |
| 2012/0026616 A1 | 2/2012 | Rawlings |

FOREIGN PATENT DOCUMENTS

| | | |
|---|---|---|
| DE | 102004054161 A1 | 8/2006 |
| DE | 102006007343 A1 | 8/2007 |
| DE | 102007004953 A1 | 7/2008 |
| DE | 102008050320 A1 | 4/2010 |
| EP | 0849977 A2 | 6/1998 |
| EP | 1605729 A2 | 12/2005 |
| JP | 09102382 A | 4/1997 |
| WO | 2004037620 A1 | 5/2004 |

OTHER PUBLICATIONS

Office Action for Korean Patent Application No. 10-2013-7016521; dated Jun. 27, 2014.
Office Action for Chinese Patent Application No. 201180065651.3; dated Mar. 27, 2015.
Search Report for German Patent Application No. 10 2010 052 472.7; dated Jun. 26, 2011.
Search Report for International Patent Application No. PCT/EP2011/005354; dated Feb. 9, 2012.
International Preliminary Report on Patentability for International Patent Application No. PCT/EP2011/005354; dated May 28, 2013.

ARRANGEMENT FOR AN IMAGE RECORDING DEVICE IN A VEHICLE

PRIORITY CLAIM

This patent application is a continuation of U.S. patent application Ser. No. 13,989,542, filed 6 Aug. 2013, which is a U.S. National Phase of International Patent Application No. PCT/EP2011/005354, filed 24 Oct. 2011, which claims priority to German Patent Application No. 10 2010 052 472.7, filed 26 Nov. 2010, the disclosures of which are incorporated herein by reference in their entirety.

FIELD

Disclosed embodiments relate to an arrangement for an image recording device in a vehicle, comprising an image recording device for recording image data. The arrangement further comprises a carrier part, which can be positioned on the vehicle with its front side on or in front of the inner side of a vehicle window, holding means for holding the image recording device, the holding means being coupled to the carrier part in such a way that the optical recording axis of the image recording device is directed into an area in front of the front side of the carrier part, and a heating device, the heating device being formed in such a way that the thermal radiation produced by it is emitted in the direction of the area in front of the front side of the carrier part. Disclosed embodiments also relate to a method for controlling the heating device in such an arrangement.

BACKGROUND

Modern motor vehicles are increasingly being fitted with image recording systems or image processing systems, in order to supply image data, for example for driver assistance systems. This involves images, particularly of the surroundings of a vehicle, being recorded and processed, the processed image data being made available completely or in segments to the vehicle driver or to internal systems in the vehicle.

The image recording system, for example a digital camera, must in this case be positioned in the vehicle in such a way that the image data can be recorded as well as possible. In order in this case also to reconcile further requirements for the positioning of the camera in the vehicle, in particular the space requirement and costs, satisfactorily with one another, various holding devices have been developed specifically for this purpose. In particular, the positioning of the camera directly on an interior windowpane of the vehicle is favorable.

Allowance must be made here for the problem that the viewing area of the camera through the vehicle window should not become obscured or impaired by misting or icing up. This problem is countered for example by heating elements that are provided on the holding device heating up the vehicle window by thermal conduction when the holding device is in contact with the vehicle window.

DE 10 2008 050 320 A1 describes such a holder for various devices, in particular cameras and sensors, that is suitable for mounting on the inner side of a windshield. A window heater may be integrated in the holder.

DE 20 2004 007 360 U1 describes an image processing system for motor vehicles. A baffle plate in the area of a holder is described, intended inter alia to minimize the incidence of scattered light from the passenger compartment of the vehicle. The baffle plate may be movable or removable, in order to make it possible for the vehicle window lying behind it to be easily cleaned. Furthermore, a heater or ventilation system may be integrated in it.

DE 10 2006 007 343 A1 describes an image recording device for a driver assistance system, in which a mobile communication device, for example what is known as a camera phone, is detachably anchored in a windshield holding device. The holding device may comprise a baffle plate and/or a heating or cooling module, in order to be able to keep the mobile communication device at a temperature that is as constant as possible. This is intended in particular to prevent the mobile device under the windshield from heating up too much in sunlight.

SUMMARY

Disclosed embodiments provide an arrangement for an image recording device and a method of the type mentioned at the beginning that make it possible for image data to be recorded as well as possible through a vehicle window under a wide range of operating conditions.

Disclosed embodiments provide an arrangement for an image recording device in a vehicle and a method for controlling a heating device for an arrangement.

BRIEF DESCRIPTION OF THE DRAWINGS

Disclosed embodiments are now explained in more detail with reference to the figures.

DETAILED DESCRIPTION OF THE DISCLOSED EMBODIMENTS

Figure 1:
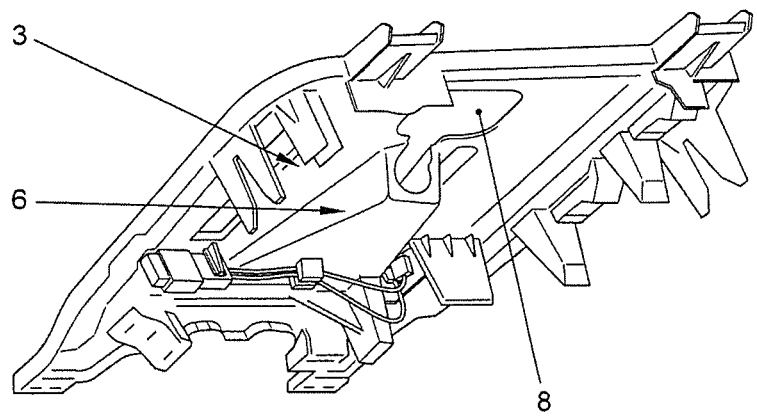
FIG. 1 shows a perspective view of a holding plate with a baffle plate of an arrangement for an image recording device.

The heating device of the arrangement can be activated in such a way that the radiant power per unit area or unit length is different for two different portions of area or portions of length. In this way, the heating power can be controlled in dependence on the radiating position and/or direction, and consequently can be adapted to the heat requirement at the location to be heated. By contrast with energy transfer by thermal conduction, the energy transfer by means of electromagnetic radiation additionally provides this arrangement with the advantage that more uniform heating up of the vehicle window takes place. Extreme temperature fluctuations that are caused by the contact areas of a thermally conducting heater can be avoided. The more uniform heating is consequently less stressful for the material and can be used in an energy-saving manner.

The heating device may be advantageously arranged on a baffle plate coupled to the carrier part. The baffle plate, which shields the image recording device in particular from scattered light from the passenger compartment of the vehicle, is in this case typically formed two-dimensionally. It may be formed substantially flat, the normals to the surface area being directed into an area in front of the front side of the carrier part. Generally, however, the baffle plate typically has a slightly curved form. The normals to the surface area of the baffle plate are consequently no longer parallel, but are in this case directed at least partially toward the area in front of the front side of the carrier part. This allows the two-dimensional property of the baffle plate to serve as a particularly suitable location for the attachment of the heating device.

The heating device is, for example, formed on the baffle plate in the form of a strip, in the manner of a matrix or two-dimensionally. Depending on the design and choice of material of the baffle plate, attachment is possible here on the front and/or rear side of the baffle plate. The heating device may be formed at least partially as a heating foil.

The heating device may be applied to the baffle plate by means of low-cost processes. It may for example be connected to the baffle plate by adhesive bonding, lamination or sputtering.

The baffle plate itself may be detachably connected to the carrier part, for example by a positive connection. This allows the baffle plate to be replaced easily and at low cost. Furthermore, the area in front of the baffle plate is thus accessible in an easy way, so that a vehicle window lying in front of it can be easily cleaned.

The arrangement may comprise a vehicle window, the front side of the carrier part being positioned on or in front of the inner side of the vehicle window. In this case it may be provided in particular that the radiant power produced by the heating device can be activated in such a way that substantially homogeneous radiant power per unit area can be received in an area on the vehicle window that lies in front of the front side of the carrier part. In particular, in this case the actual geometry of the arrangement of the heating device with respect to the vehicle window or the devices to be heated can be taken into consideration. Consequently, uniform heating of the vehicle window can be achieved even when there are two points on the heating device that have different shortest distances from the vehicle window in comparison with each other.

The thermal radiation per unit area produced by the heating device may for example be different from area to area on account of a differing line density and/or on account of differing line thicknesses. A greater number of electrical strip conductors, including in the configuration as a heating foil, leads to a greater development of heat per unit area, and consequently a greater thermal radiation, being achieved. Such an effect can also be achieved by variation of the cross section of the conductors, since with thinner conductor cross sections a higher specific conduction resistance per unit length results under conditions which are otherwise the same, so that more electrical energy per unit length is converted into heat as a result of the increased ohmic resistance.

In the case of the method for controlling a heating device for an arrangement comprising an image recording device in a vehicle, the optical recording axis of the image recording device is directed into an area on the vehicle window, the image recording device recording image data or being ready for recording. A heating device is formed in such a way that the thermal radiation produced by it is emitted in the direction of the area on the vehicle window. The heating device of the method is activated in such a way that substantially homogeneous radiant power per unit area is received in the area on the vehicle window. The arrangement may be used in particular for carrying out the method.

The activation of the heating device may take place for example by multiple separately controlled, partially superposed line circuits. Activating the heating device differently in different areas allows a homogeneous radiant power per unit area to be achieved on a vehicle window lying behind it even when a specific type of carrier part is used at different positions of vehicle windows or in different vehicle models. The resultant differences in the geometry of the arrangement and in the distance of individual points on the heating device with respect to the vehicle window can be compensated by the method.

Further disclosed is a vehicle equipped with the arrangement described hereinabove for an image recording device.

Shown in perspective in FIG. 1 is the rear side of the holding plate 3, which can be used as a carrier part in an arrangement for a multifunctional camera 1 (not represented) in a vehicle according to at least one disclosed embodiment. The holding plate 3 comprises an opening 8, through which the multifunctional camera 1 can record images from the direction of the front side of the holding plate 3.

In order to minimize the incidence of scattered light from the interior of the vehicle, the area adjacent the opening 8 is covered by a baffle plate 6. The baffle plate 6 is in this case detachably connected to the holding plate 3 and is for example clipped into it by a positive connection. The holding plate 3 is produced from a dimensionally stable plastic and may for example be adhesively attached to the inner side of a vehicle window.

Figure 2:
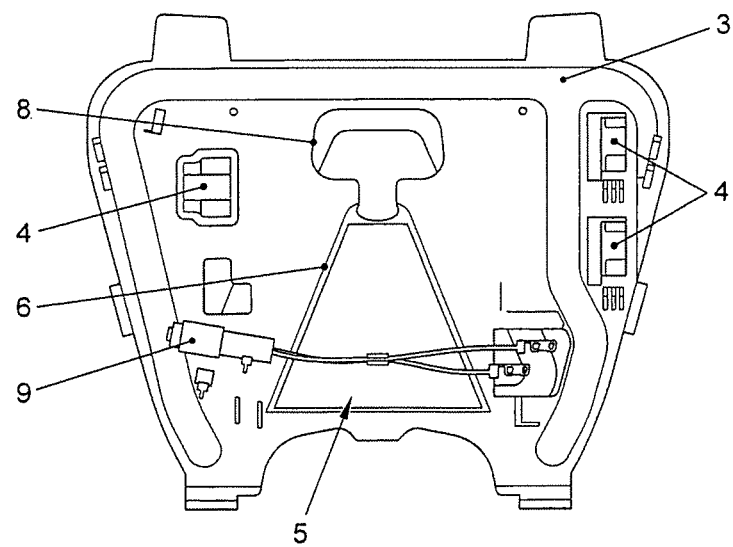
FIG. 2 shows the rear side of the holding plate from FIG. 1, facing away from the vehicle window, with a baffle plate which is equipped with a two-dimensional heating foil, according to at least one disclosed embodiment of the arrangement for an image recording device.
Figure 3:
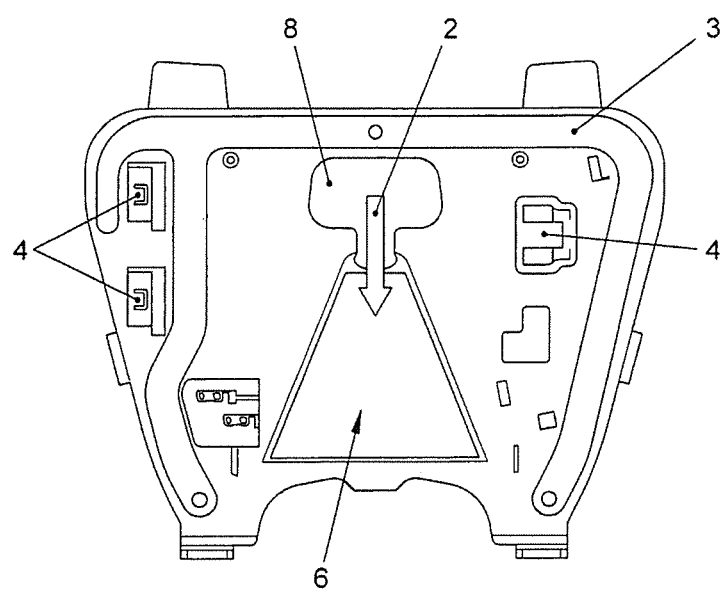
FIG. 3 shows the front side of the holding plate shown in FIG. 2, facing the vehicle window.

In FIGS. 2 and 3, the front side and the rear side of the holding plate 3 that is shown in FIG. 1 are respectively represented in greater detail. The front side is in this case facing the vehicle window and the rear side is facing away from the vehicle side when the holding plate 3 is positioned as provided by the arrangement on or in front of the inner side of a vehicle window.

The holding plate 3 comprises multiple engagement clasps 4 for holding the multifunctional camera 1 (not represented), in order that its optical recording axis 2 can be aligned through the opening 8 into an area in front of the front side of the holding plate 3.

Laminated on the rear side of the detachably fastened baffle plate 6 is a heating foil 5, which can be supplied with electrical energy via electrical connections 9. Alternatively, instead of the heating foil 5, other heating devices may also be provided. In particular, it may be a fine-meshed metal grid or netting, which is connected to the baffle plate 6 for example by adhesive bonding. The heating device 5 may also be applied two-dimensionally to the baffle plate 6 by sputtering. The baffle plate 6 may have a heating device 5 on the front side and/or the rear side. The electrically fed heating foil 5 develops a thermal radiation, which is radiated in particular in the direction of the normals to the surface area of the baffle plate 6.

Individual areas of the heating foil 5 are in this case formed in such a way that the development of heat per unit area or unit length is different for different portions of area or portions of length. This may either be accomplished technically in terms of the device, by the density of the electrical lines in the heating device 5 of two areas being different, so that, when there is a uniform voltage supply, the development of heat is proportional to the line density. Or else the line thickness may be different at different locations, so that, at locations with thinner lines, a higher ohmic resistance leads to a greater heating effect. In particular, however, the supply of current via the electrical connections 9 may also be controlled technically in terms of the method such that different areas of the heating device 5 reach a different temperature, and consequently radiate heat to differing degrees.

Figure 4:
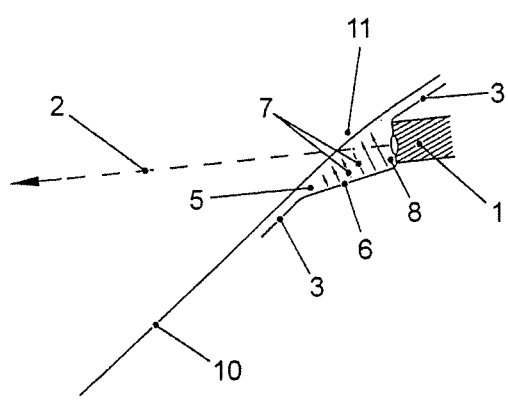
FIG. 4 schematically shows a sectional view of at least one disclosed embodiment of the arrangement on the inner side of the windshield of a vehicle.

Schematically represented in FIG. 4 is a sectional view of at least one disclosed embodiment of the arrangement on the inner side of a windshield 10 of a vehicle. The holding plate 3 may in this case be fastened to the inner side of the windshield 10, so that the multifunctional camera 1 can record images in the forward direction of the vehicle through the opening 8 along the optical recording axis 2. The baffle plate 6 is provided two-dimensionally with a heating foil 5, so that, in the direction of the normals 7 to the surface area of the baffle plate 6, thermal radiation are emitted into an area 11 of the windshield 10 through which the multifunctional camera 1 records image data.

The heating foil 5 may be electrically activated in such a way that the area 11 of the windshield 10 lying opposite the baffle plate 6 receives substantially the same radiant power per unit area. In particular, the areas of the heating foil 5 that lie closer to the windshield 10 are electrically heated less than the areas that are further away from the windshield 10. In this way, a uniform temperature is achieved in the area 11 of the windshield 10, so that this area 11 can be heated quickly, precisely and in an energy-saving manner, without harmful material stresses in the windshield 10 or on the holding plate 3 possibly being caused by local instances of overheating. In this way it can be prevented that the area 11 of the windshield 10 becomes misted or iced up.

LIST OF DESIGNATIONS

1 multifunctional camera
2 optical recording axis of the multifunctional camera
3 holding plate
4 engagement clasp
5 heating foil
6 baffle plate
7 normal to the surface area of the baffle plate
8 opening
9 electrical connection
10 windshield
11 area in front of the holding plate

The invention claimed is:

1. An arrangement for an image recording device in a vehicle, the arrangement comprising:
    an image recording device for recording image data;
    a carrier part positionable on the vehicle with the carrier part's front side on or in front of an inner side of a vehicle window;
    a holder for holding the image recording device, the holder being coupled to the carrier part so an optical recording axis of the image recording device is directed into an area in front of the front side of the carrier part; and
    a heating device formed so the thermal radiation produced by the heating device is emitted in a direction of the area in front of the front side of the carrier part,
    wherein the heating device is arranged and/or can be activated such that radiant power per unit area or unit length is different for two different portions of area or portions of length,
    wherein the heating is arranged on a baffle plate coupled to the carrier part, and
    wherein the heating device is formed at least partially as a heating foil configured to produce thermal radiation radiated in directions normal to a surface area of the baffle plate.

2. The arrangement of claim 1, wherein the heating device is formed on the baffle plate in the form of a strip, in the manner of a matrix or two-dimensionally.

3. The arrangement of claim 1, wherein the heating device is connected to the baffle plate by adhesive bonding, lamination or sputtering.

4. The arrangement of claim 1, wherein the arrangement comprises a vehicle window, the front side of the carrier part being positioned on or in front of the inner side of the vehicle window.

5. The arrangement of claim 4, wherein there are two points on the heating device that have different shortest distances from the vehicle window in comparison with each other.

6. The arrangement of claim 4, wherein the radiant power produced by the heating device can be activated so that substantially homogeneous radiant power per unit area can be received in an area on the vehicle window that lies in front of the front side of the carrier part.

7. The arrangement of claim 1, wherein the thermal radiation per unit area produced by the heating device is different from area to area on account of a differing line density and/or line thickness.

8. A method for controlling a heating device for an arrangement, the method comprising:
    directing an optical recording axis of an image recording device in a vehicle into an area on a vehicle window,
    wherein the image recording device records image data or is ready for recording image data; and
    emitting thermal radiation by the heating device in the direction of the area on the vehicle window,
    wherein the heating device is activated so that substantially homogeneous radiant power per unit area is received in the area on the vehicle window,
    wherein the heating is arranged on a baffle plate coupled to the carrier part, and
    wherein the heating device is formed at least partially as a heating foil configured to produce thermal radiation radiated in directions normal to a surface area of the baffle plate.

* * * * *